(12) United States Patent  (10) Patent No.: US 7,584,432 B1
Oakley et al.                (45) Date of Patent: Sep. 1, 2009

(54) INTERACTIVE DISPLAY SYSTEM (75) Inventors: Andrew Robert Oakley, Blackburn (GB); Ian Spencer Joscelyne, Preston (GB); Peter Unsworth, Slaidburn (GB)

(73) Assignee: Promethean Limited, Lancashire (GB)

( * ) Notice: Subject to any disclaimer, the term of this patent is extended or adjusted under 35 U.S.C. 154(b) by 0 days.

(21) Appl. No.: 09/889,137

(22) PCT Filed: Jan. 5, 2000

(86) PCT No.: PCT/GB00/00012

§ 371 (c)(1),
(2), (4) Date: Jul. 12, 2001

(87) PCT Pub. No.: WO00/42494

PCT Pub. Date: Jul. 20, 2000

(30) Foreign Application Priority Data

Jan. 13, 1999 (GB) .................................. 9900555.5

(51) Int. Cl.
*G06F 3/00* (2006.01)
(52) U.S. Cl. .................. 715/761; 715/764; 715/753
(58) Field of Classification Search ................. 345/763, 345/179, 173, 158, 767, 163; 341/22; 362/236; 434/118
See application file for complete search history.

(56) References Cited

U.S. PATENT DOCUMENTS

| 4,538,993 A * | 9/1985 | Krumholz .................. 434/118 |
| 5,063,600 A * | 11/1991 | Norwood .................... 382/186 |
| 5,176,520 A | 1/1993 | Hamilton |
| 5,495,269 A * | 2/1996 | Elrod et al. ................. 345/179 |
| 5,528,235 A * | 6/1996 | Lin et al. ...................... 341/22 |
| 5,561,446 A * | 10/1996 | Montlick .................... 345/173 |
| 5,583,323 A * | 12/1996 | Zurstadt et al. .......... 178/18.01 |
| 5,689,562 A * | 11/1997 | Hassan et al. ................ 382/236 |
| 5,790,114 A * | 8/1998 | Geaghan et al. ............ 345/763 |
| 5,854,621 A * | 12/1998 | Junod et al. ................. 345/158 |

(Continued)

FOREIGN PATENT DOCUMENTS

DE 19535119 3/1997

(Continued)

OTHER PUBLICATIONS http://www.answers.com/topic/display-device.*

(Continued)

*Primary Examiner*—Boris Pesin
(74) *Attorney, Agent, or Firm*—Venable LLP; Michael A. Sartori; Justine A. Gozzi (57) ABSTRACT An interactive display system comprises a white board which communicates with a PC. A projector receives signals from the PC which are translated into corresponding projection image which is projected on to the white board. The image projected on to the white board is the same as that shown on a computer screen. By using an electronic pen the position of which can be detected electronically by means of a plurality of wires embedded beneath the surface of the white board and using methods already known in the art, the electronic pen can function the same way as a computer mouse. The image projected on to the white board may also be manipulated by means of a remote control device, which uses infra red communication to transmit signals to a transponder built within the white board.

22 Claims, 8 Drawing Sheets

U.S. PATENT DOCUMENTS

| | | | |
|---|---|---|---|
| 5,877,745 A | 3/1999 | Beeteson et al. | |
| 6,065,076 A * | 5/2000 | Sorenson | 710/72 |
| 6,414,673 B1 * | 7/2002 | Wood et al. | 345/173 |
| 6,683,628 B1 * | 1/2004 | Nakagawa et al. | 715/799 |
| 6,699,043 B2 * | 3/2004 | Ho et al. | 434/236 |
| 6,920,614 B1 * | 7/2005 | Schindler et al. | 715/726 |

FOREIGN PATENT DOCUMENTS

| | | |
|---|---|---|
| EP | 0 279 558 | 8/1988 |
| JP | 4-149625 | 5/1992 |
| JP | 5-232863 | 10/1993 |
| JP | 07-262133 | 10/1995 |
| JP | 8-171455 | 2/1996 |
| JP | 08-166843 | 6/1996 |
| JP | 9-146703 | 6/1997 |
| JP | 11-134321 | 5/1999 |

OTHER PUBLICATIONS

Patent Abstracts of Japan, Publication No. 08-044467, Feb. 16, 1996.

* cited by examiner

INTERACTIVE DISPLAY SYSTEM

BACKGROUND OF THE INVENTION

This invention relates to an interactive display system, particularly, but not limited to an interactive display system which includes a remote signalling device.

Existing interactive displays make use of an electronic whiteboard which can sense the position of an electronic pen on the surface of the whiteboard. When a computer display is projected onto the whiteboard and its position calibrated, the electronic pen can be used in the same way as a computer mouse to manipulate objects on the computer display by passing the electronic pen over the surface of the whiteboard. This type of interactive whiteboard enables the teacher to manipulate and annotate material rapidly as a result of audience questions. The use of interactive whiteboards improves teaching productivity and also improves student comprehension. Such whiteboards allow use to be made of good quality digital teaching materials, and allow data to be manipulated and presented using audio visual technologies.

Problems arise with these existing interactive whiteboards in that it is difficult to assess a student's comprehension of the material. Also, the systems require a cumbersome amount of wiring between the various parts of the system.

It is an object of the present invention to address to above mentioned disadvantages.

DE 19535119 discloses an interactive display system in which student feedback devices are hardwired to a teacher's computer, with the computer having a display connected thereto.

U.S. Pat. No. 5,176,520 discloses an information delivery system having a tutor station and at least one student station, for displaying teacher information from the tutor station on the student station.

EP 279558 comprises a series of student workstations connected to a central teacher workstation which controls the other workstations.

SUMMARY OF THE INVENTION

According to a first aspect of the present invention an interactive display system comprises a display device, an image projector, computing means and at least one remote signalling device, in which the computing means is arranged to supply image information to the projector, which is arranged to project said image information onto the display device; in which the or each remote signalling device is operable to transmit signals to a receiver portion of the display device, the display device being arranged to supply the signals to the computing means, said signals being stored by the computing means for display, and the display means is a communications hub of the display system arranged to receive control signals from a pointing device and/or a remote control device and transmit those signals to the computing means in order to control the image projected onto the display means.

In preferred embodiments the display means uses a single communications link between it and the computing means which is capable of conveying signals both from the pointing device and the or each remote signalling device, to enable a most efficient transfer of data. Preferably this single link is a wireless connection such as infra-red means or radio means.

The or each remote signalling device, may be a remote control device which is operable to transmit control signals to a receiver portion of the display device, which control signals are supplied to the computing means and are operable to control the computing means and thus image information supplied to the projector.

The display device may include a wireless transmitter portion, preferably integral with the receiver portion.

The display device may include position indication means for indicating the position of a pointing device relative to a surface of the display device.

The interactive display system may be operable to calibrate the location of an image projected onto the display device relative to the display device. The pointing device may be operable to effect the calibration.

The pointing device may be operable to induce image control signals in the position indication means, which image control signals are operable to control the computing means and thus image information projected onto the display means. Alternatively, pressure exerted by the pointing device on the display means may induce control signals in the position indication means. A further alternative is that the pointing device may include a laser, the position of light from which on the display means is used to cause control signals in the position indication means to be generated.

The pointing device may be arranged to take precedence over the or each remote signalling device, with signals from the or each remote signalling device being ignored if signals from the pointing device are being received.

The pointing device may be operable to selectively enable the or each remote signalling device, preferably by signals supplied via the display means.

The receiver portion of the display device may be located in an upper part thereof, preferably on a front face thereof.

The display device may include an output portion arranged to transmit signals from both the receiver portion and the position indication means to the computing means. The output portion may transmit the signals by wire link or by wireless link. The output portion may be operable to pass signals by wire to a separate wireless transmitter for transmission. Said wireless transmitter portion may be mounted for ease of transmission to the computing means, on a ceiling for instance. The wireless transmitter may also be a wireless receiver, to receive signals from the or each remote signalling device.

The computing means may be a standalone computer, such as a personal computer or may be a networked computer or networked computer server.

The or each remote signalling device may be operable to transmit signals to the receiver portion only in response to a request signal from the display means, preferably from the transmitter portion. Where a plurality of remote signalling devices are provided, the display means may request information from each remote signalling device in turn, by polling. For instance, by interrogating each remote signalling device in turn to gather data from them sequentially. It will be understood however that other arrangements may be utilised and that the system may allow for simultaneous reception of data from more than one such remote signalling device.

The or each remote control device may be operable to control the computing means in substantially the same manner as a keyboard and mouse combination.

The system preferably comprises one master control device, which may be a remote control device or a pointing device, and a plurality of subsidiary remote signalling devices, in which case the master control device is preferably operable to control display means and computer to selectively activate and deactivate the subsidiary signalling devices.

The subsidiary remote signalling devices may be response devices for responding to information displayed on the display means by a person controlling the master control device.

According to another aspect of the invention an interactive display system comprises a display device, computing means and at least one remote signalling device, in which the computing means is arranged to supply image information to the display device; and in which the or each remote signalling device is operable to transmit signals to a receiver portion of the display device, the display device being arranged to supply the signals to the computing means, said signals being stored by the computing means for display.

According to another aspect of the present invention a method of operating an interactive display system comprises projecting an image of a computer display of a computer onto a display device, receiving signals at a receiver portion of the display device, which signals are transmitted from at least one remote signals device, and transmitting those signals to the computer, and in which the display means is a communications hub of the display system arranged to receive control signals from a pointing device and/or a remote control device and transmit those signals to the computing means in order to control the image projected onto the display means.

The method may include the signals from the or each remote signaling device being independent of the location of the remote signalling device relative to the display means for instance the signals from the remote signalling device may contain non-position related data.

The signals from the or each remote signalling device are preferably transmitted in response to information displayed on the display device.

According to a further aspect of the present invention an interactive display device comprises a receiver portion for receiving signals from a remote signalling device, the display device being operable to supply the received signals to a computing means and suitable for displaying an image from a computing means projected onto said display device, in which the display device forms a communications hub for an interactive display system.

DETAILED DESCRIPTION OF THE INVENTION

Figure 1:
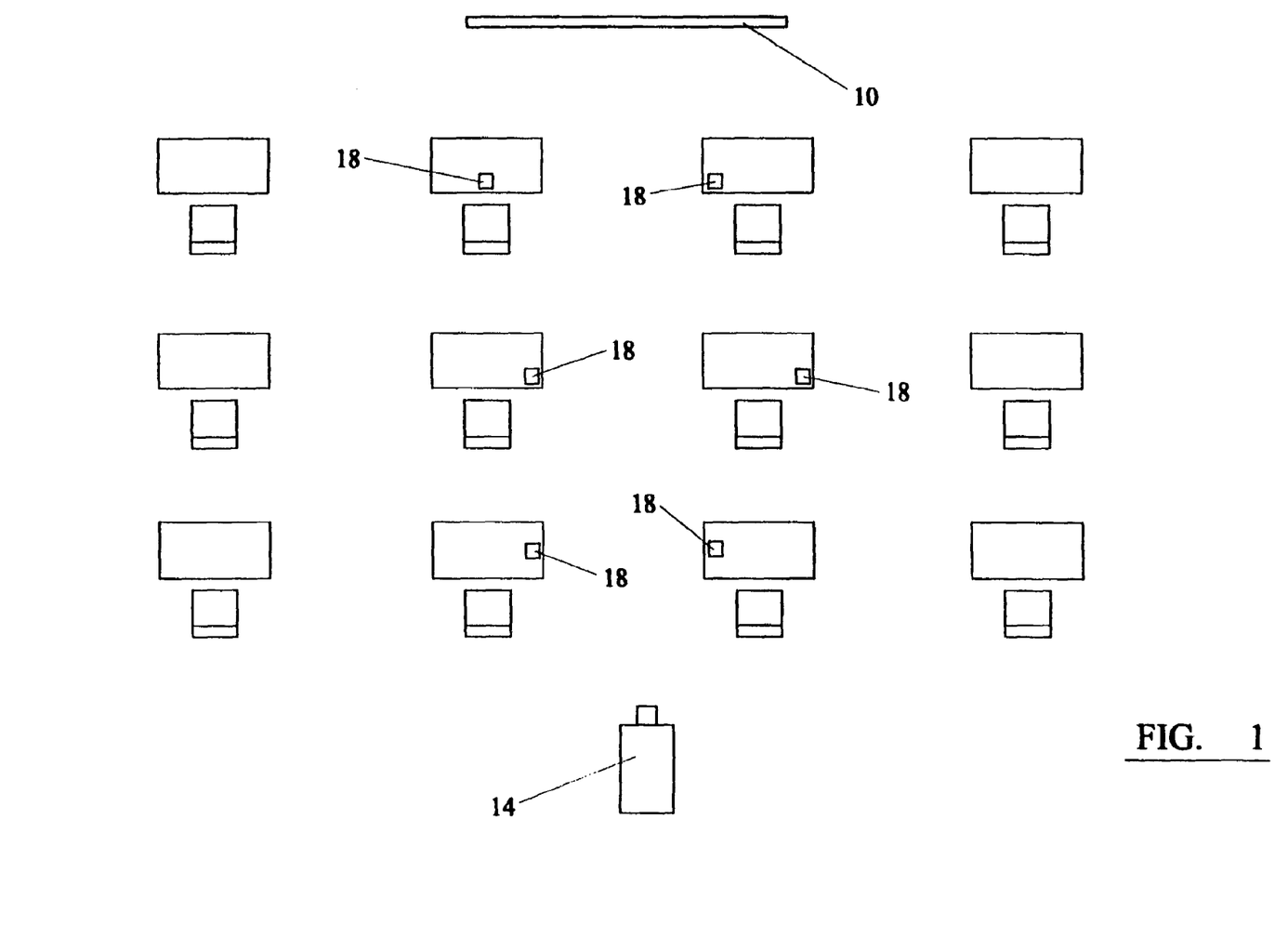
FIG. 1 is a schematic view from above of an interactive display system installed in a classroom.
Figure 2:
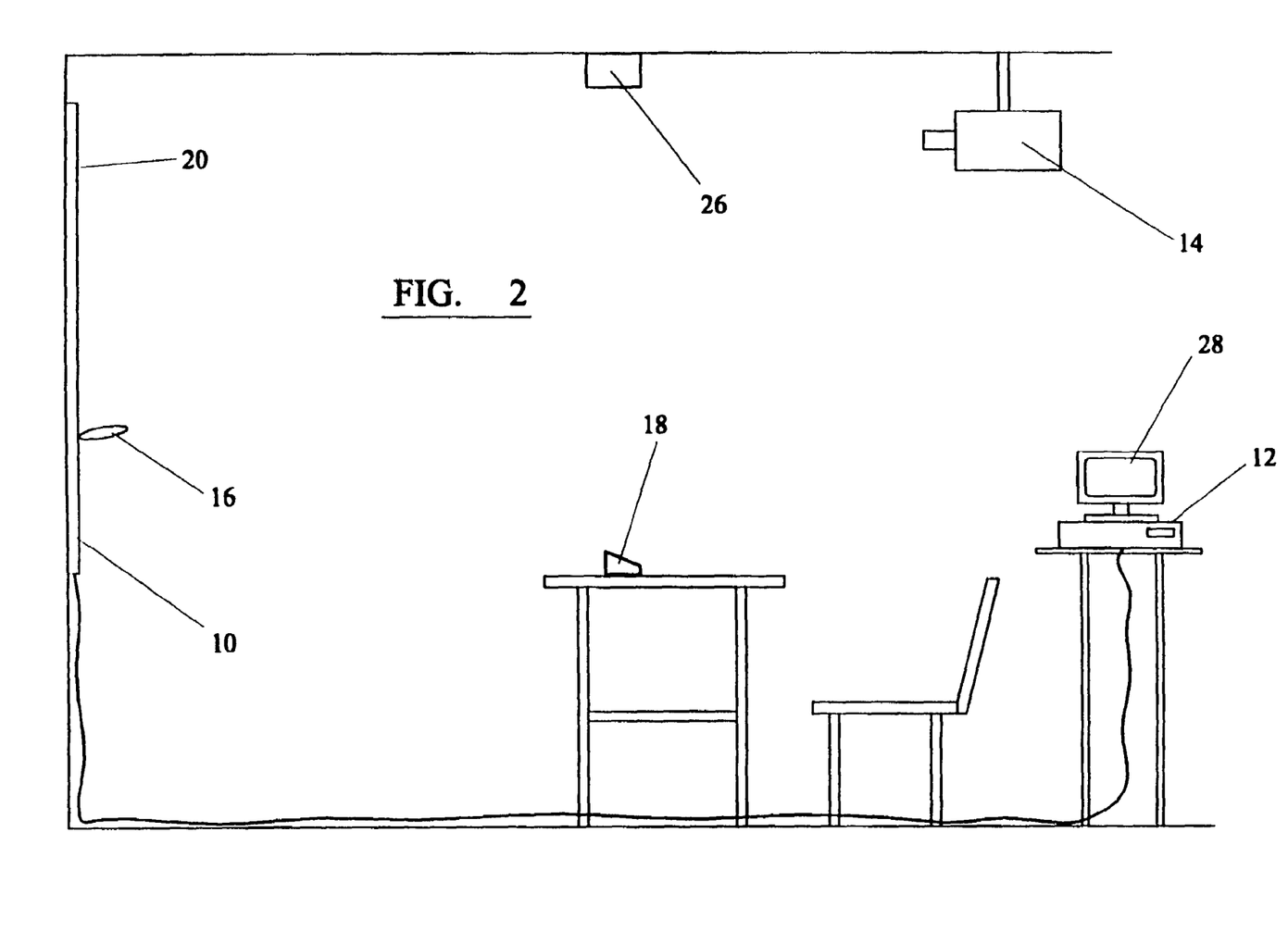
FIG. 2 is a schematic side view of the layout in FIG. 1.

Referring to FIG. 2, an interactive display system comprises a whiteboard 10 which communicates with a PC 12. A projector 14 receives signals from the PC 12 which are translated in to a corresponding projection image which is projected on to the whiteboard 10.

The image projected on to the whiteboard 10 is the same as that shown on a computer screen 28. By using an electronic pen 16, the position of which can be detected electronically by means of a plurality of wires embedded beneath the surface of the whiteboard 10, and using methods already known in the art, the electronic pen 16 can function in the same way as a computer mouse. Alternatively, the whiteboard may be of the resistive type, in which the presence of a pointing device is detected by pressure causing two layers to contact each other at a particular location, which location is then detected. A further alternative is the use of a laser pen. The position on the whiteboard of a light spot from the pen is calculated by detecting a reflection of the laser light from the whiteboard back to the laser pen by triangulation.

The image projected on to the whiteboard 10 may also be manipulated by means of a remote control device 18, which uses infrared communication to transmit signals to a transponder 20 built into the whiteboard 10. The signals received by the transponder 20 are then relayed to the PC 12, either by a wire link or a wireless link.

Figure 6:
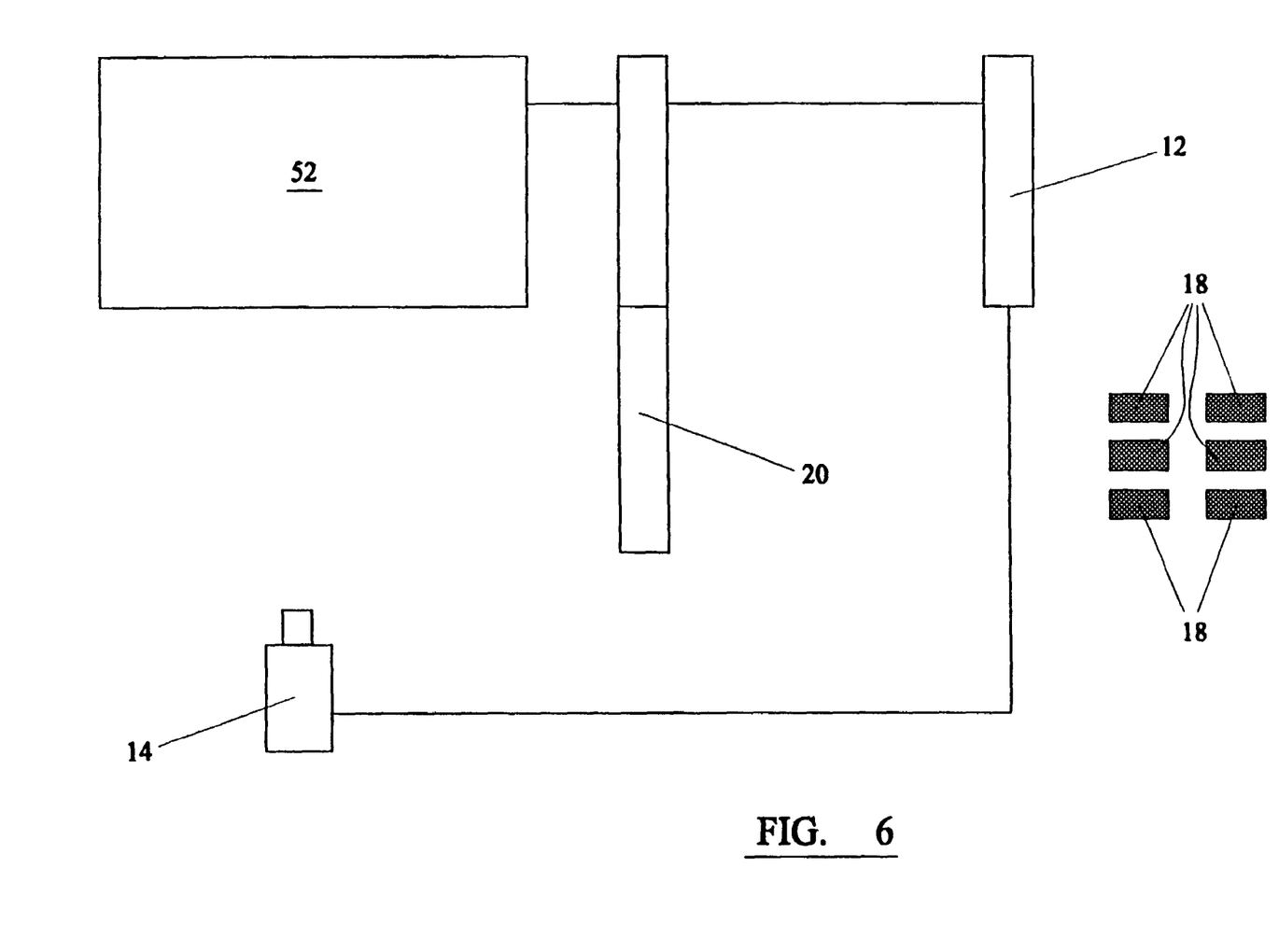
FIG. 6 is a schematic diagram of the interconnections between the various parts of an interactive display system installation.

FIG. 6 shows a typical schematic of the connections between various parts of the interactive display system.

Figure 3:
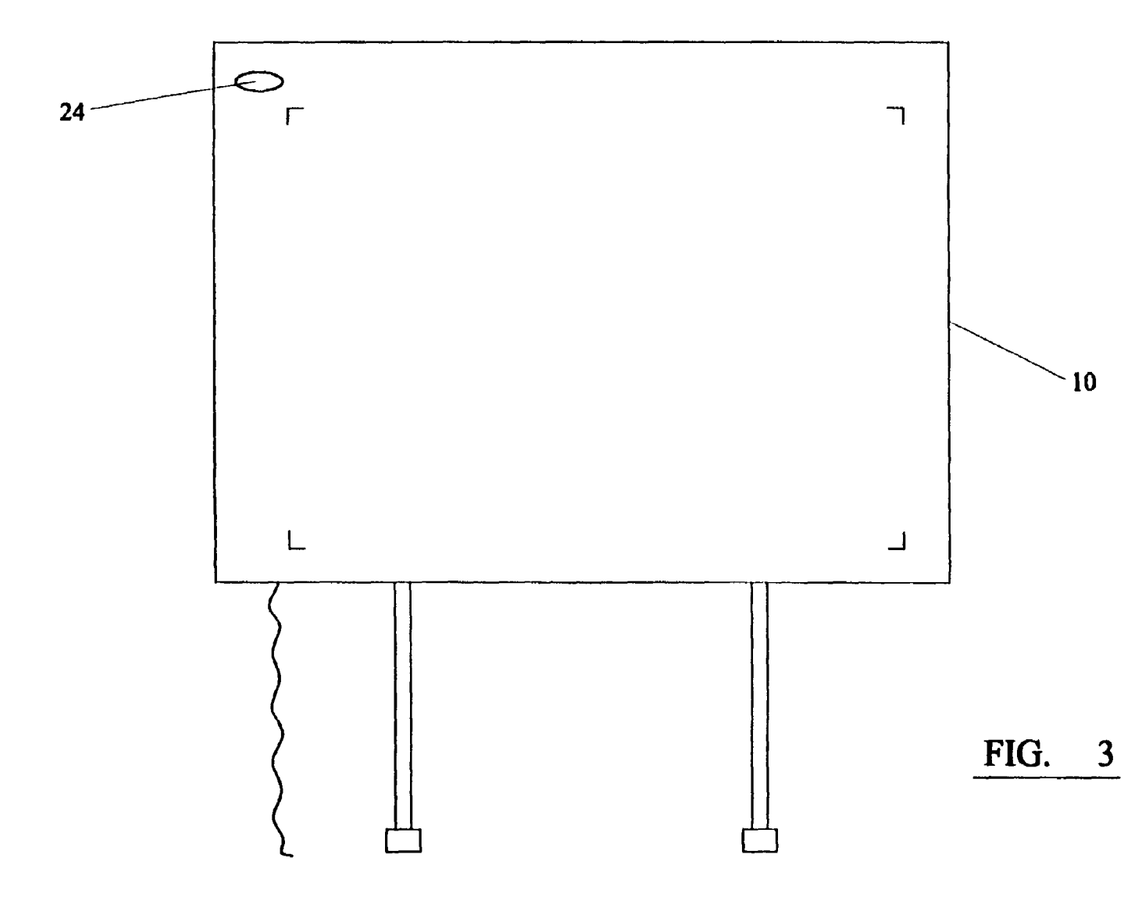
FIG. 3 is a schematic front view of an interactive display device.

The whiteboard 10 comprises a grid portion 52 which comprises two sets of wire loops arranged orthogonally to each other. An electric signal from the pen 16 induces a current in the wire loops which can be used to determine the position of the pen 16. The infrared transponder 20 is located behind an optical window 24 on an upper part of the front of the whiteboard 10 which allows two way infrared communications. Also, a connector (not shown) is provided on the rear of the whiteboard 10, which connector allows signals to and from the infrared transponder 20 of the whiteboard to be directed to an auxiliary high power and high sensitivity infrared transponder module 26 (see FIG. 2) which could be attached to the ceiling of a classroom to provide greater coverage for a large classroom.

The whiteboard 10 is connected to the PC 12 via an RS232 serial port or a USB (universal serial bus) port. The PC 12 may alternatively be a semi-intelligent network device controlled by a central server system or it could be a local PC, which is stand alone or networked.

Display data from the PC 12 is fed to the projector 14 which can either be freestanding or ceiling mounted. The display, which is normally seen on the monitor 28 of the PC 12 is projected on to the whiteboard 10.

The electronic pen 16 assumes the functionality of the mouse of the PC 12 and allows a presenter to control the computer desktop and any applications run by the PC 12. By using suitable software the pen 16 may be able to function as a keyboard.

Figure 4:
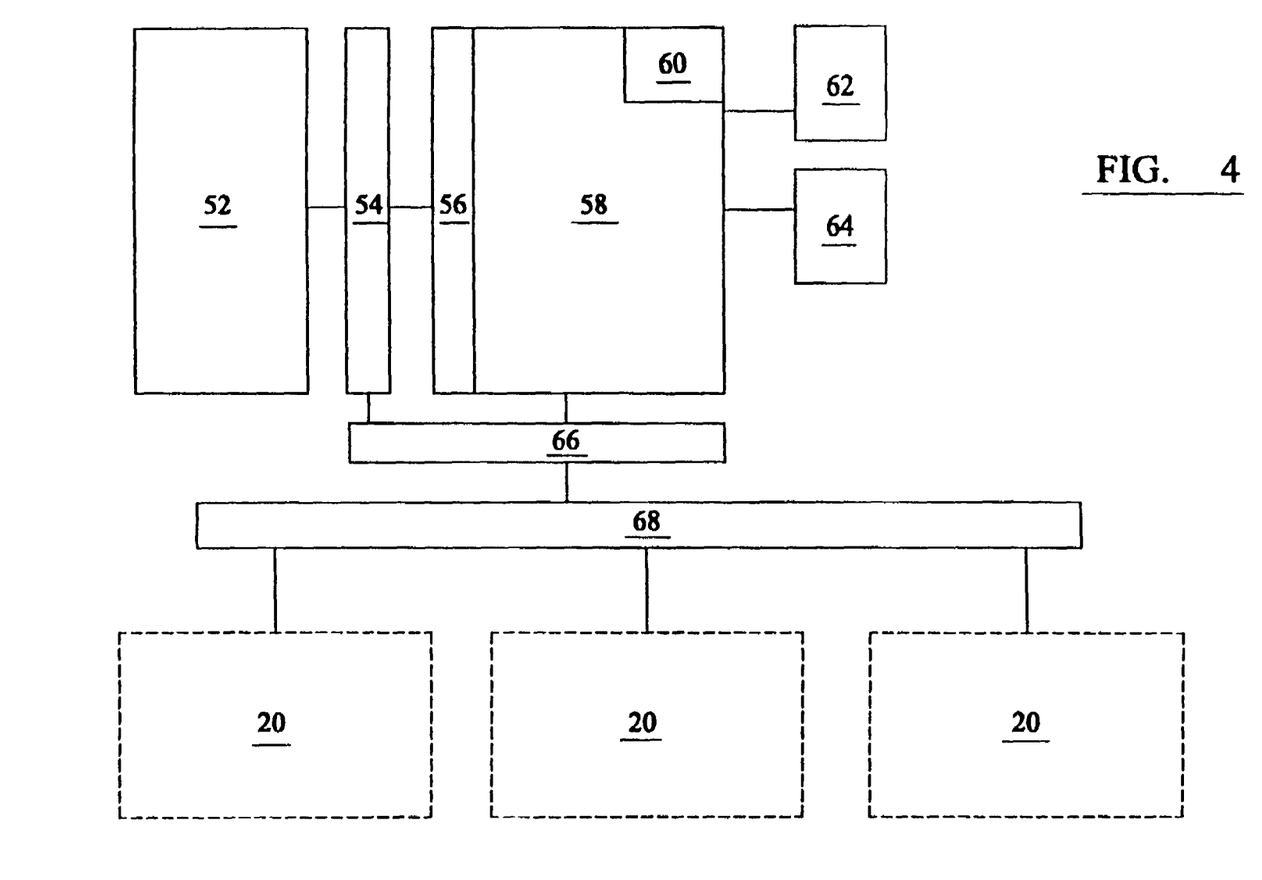
FIG. 4 is a schematic block diagram of the parts of interactive display device.

FIG. 4 is a schematic block diagram of the whiteboard 10. As described above, the whiteboard 10 includes a grid 52 which comprises two sets of wire loops arranged at right angles to each other. A signal processing unit 54 determines the position of the electronic pen 16 on the whiteboard grid 52. An analogue to digital converter 56 converts signals from the signal processing unit 54 into digital information which is passed to a microprocessor 58 which includes flash memory 60. Output from the microprocessor can optionally be put through an RS232 serial port 62 or a USB port 64. Signals from the microprocessor 58 and the signal processing unit 54 are supplied to a control logic unit which passes signals to a wireless communications expansion port 68 which in turn communicates with one of an infrared transponder module, a 418/433 MHz or 868/870 MHz radio module or a 2.4 GHz spread spectrum module, which ever is selected.

Figure 5:
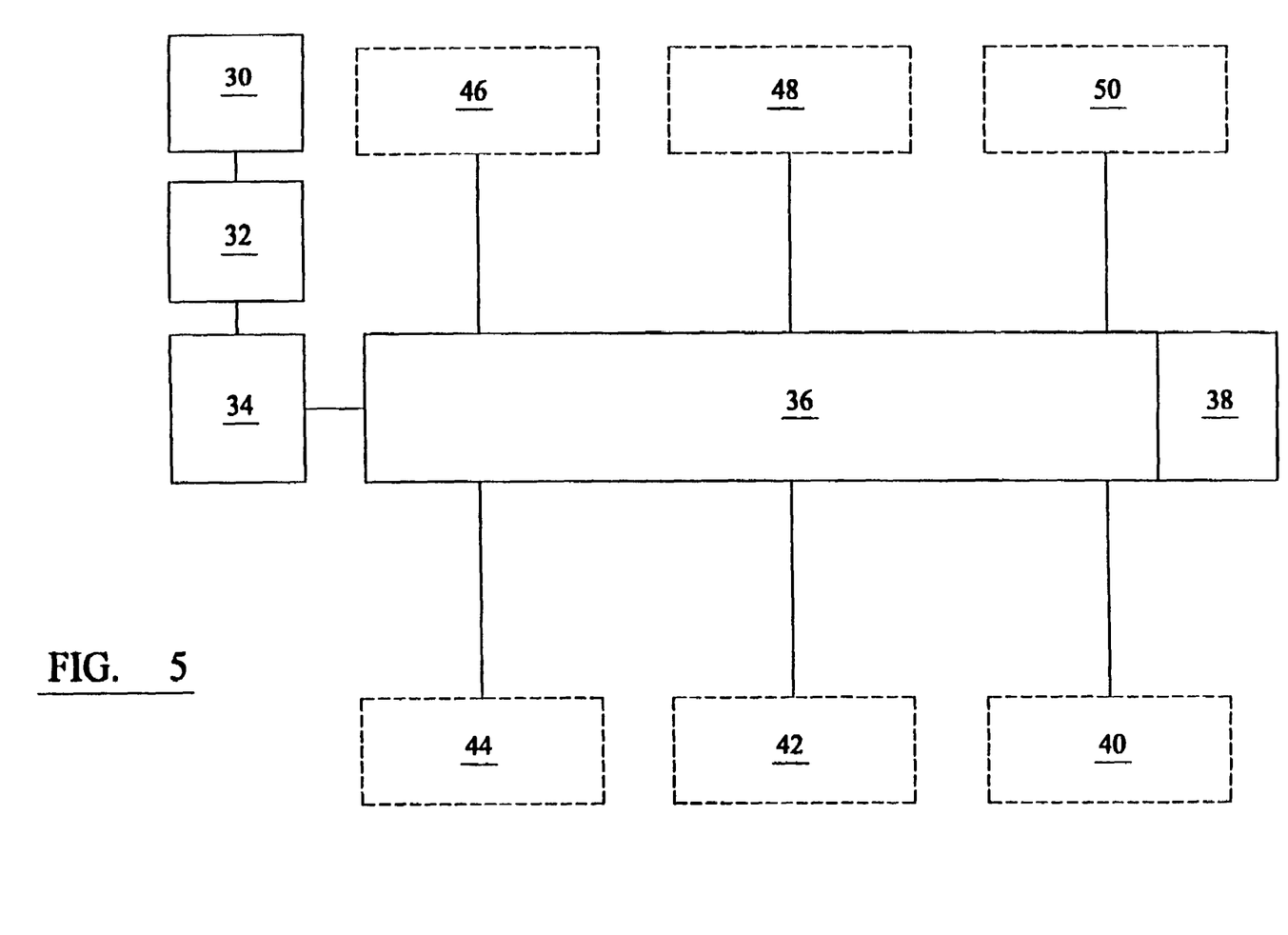
FIG. 5 is a schematic block diagram of the parts of a feedback device for use with the interactive display system.

FIG. 5 shows a schematic block diagram of one of the remote control devices 18. The blocks shown in dashed lines are optional. Each remote control device 18 comprises a microprocessor 36 which is powered by a battery module 32 and power management hardware 34. The battery module 32 has a battery charger circuit 30. The microprocessor 36 includes flash memory 38. The microprocessor 36 may receive input from one or both of a tablet module 40 or a keypad 42. The remote control device 18 may optionally have an LCD display 44. The microprocessor 36 may receive external signals from an infrared transceiver module 46, a 418/433 MHz or 868/870 MHz radio module 48 or a 2.4 GHz spread spectrum module 50.

The electronics within the whiteboard 10 process the signals from the whiteboard surface and grid portion 52 (see FIG. 6) and thus determine the position of the pen and information corresponding to buttons (not shown) pressed on the electronic pen 16. The infrared transponder 20 uses a standardised infrared technology which is commonly available. This facility allows "wireless" connectivity to third party devices using pre-existing software drivers. An alternative would be to use existing radio frequency technology instead of infrared technology.

The remote control device 18 communicates with the transponder 20 of the whiteboard 10 using infrared. The remote control device 18 is suitably for use by a teacher to control the display projected onto the whiteboard 10 in a similar manner to a standard computer mouse or the electronic pen 16 mentioned above. The remote control device 18 may alternatively be used by a student who would be allowed to write on the whiteboard 10 or control applications of the PC 12 projected onto the whiteboard 10 without the student having to leave his seat. When the remote control device 18 is arranged for use by a student, a teacher would typically have control of the electronic pen 16. The pen 16 takes precedence over the remote control device 18 in the situation where signals are supplied to control the whiteboard 10 from the remote control device 18 and the electronic pen 16 simultaneously.

In addition to or as a replacement for the remote control device 18 the display system may comprise a plurality of student remote control units 18. In this case access to control the display on the whiteboard 10 can be controlled by a teacher having a master remote control device 18 or by using the electronic pen 16. The control of precedence of signals from the electronic pen 16 over those from one or more of the remote control devices 18 is effected by suitable communication protocols.

The remote control devices 18 may take the form of a keypad unit or a display device or a combination of the two.

When a plurality of remote control devices 18 are used a teacher may pose questions which are displayed on the whiteboard 10, which are answered by students having one of the remote control devices 18. In order to obtain the students' answers, the whiteboard 10 transmits a request from the transponder 20 to all of the remote control devices 18 in turn. The request includes an address and a type code for a particular device with which it wishes to communicate. The relevant device having the specified address will then transmit a response given by a student (and stored in memory) back to the whiteboard 10. Depending on the type of control device 18 the response data may be positional (ie; to give a location on the whiteboard display), alphanumeric, information on a simple button press on the device (ie; where the student has been asked for a YES/NO answer by pressing one of two buttons) or the response data may be a combination of all three.

For remote control devices 18 which include a display, the transponder 20 on the whiteboard 10 will transmit alphanumeric or graphical information to the device which is to be displayed on the remote control device display.

In a situation where a teacher is setting a student comprehension test, the teacher either requests graphical interaction from a particular student or alternatively, poses a set of questions on the whiteboard 10 and invites alphanumeric responses from the whole class. In the former case, the whiteboard 10 transmits information to a particular remote control device 18 via the transponder 20, which transponder 20 then waits for a response from the chosen remote control device 18. In the latter case the transponder 20 of the whiteboard 10 sends out requests for information from each of the individual remote control devices 18 within the room. These requests are made on a sequential basis with only one remote control device 18 replying at a particular time. This is achieved by each remote control device 18 having a specific device type code and a unique address.

Figure 7:
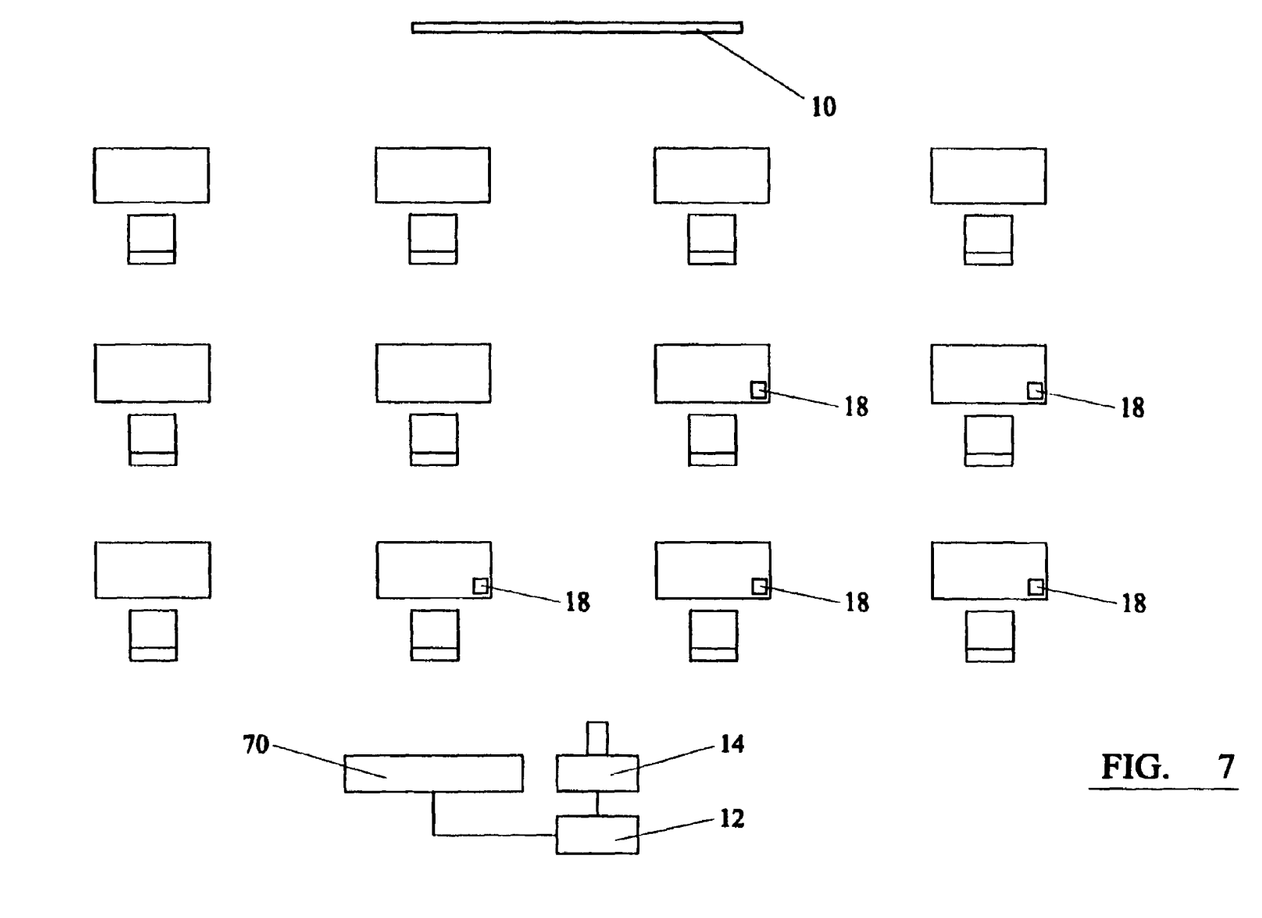
FIG. 7 is a schematic view from above of a classroom layout for an alternative embodiment of interactive display system.

FIG. 7 shows an alternative arrangement of the interactive display in which rather than using the serial port 62 or the USB port 64 with a corresponding wire connection shown in FIG. 4 between the whiteboard 10 and the PC 12, instructions are sent between the whiteboard 10 and the PC 12 by means of a transponder on the whiteboard 10 which transmits signals to an infrared or radio receiver unit 70 which is connected to the PC 12. In the example shown in FIG. 7 the projector and PC are separate units, but the two could be a single integrated unit.

Figure 8:
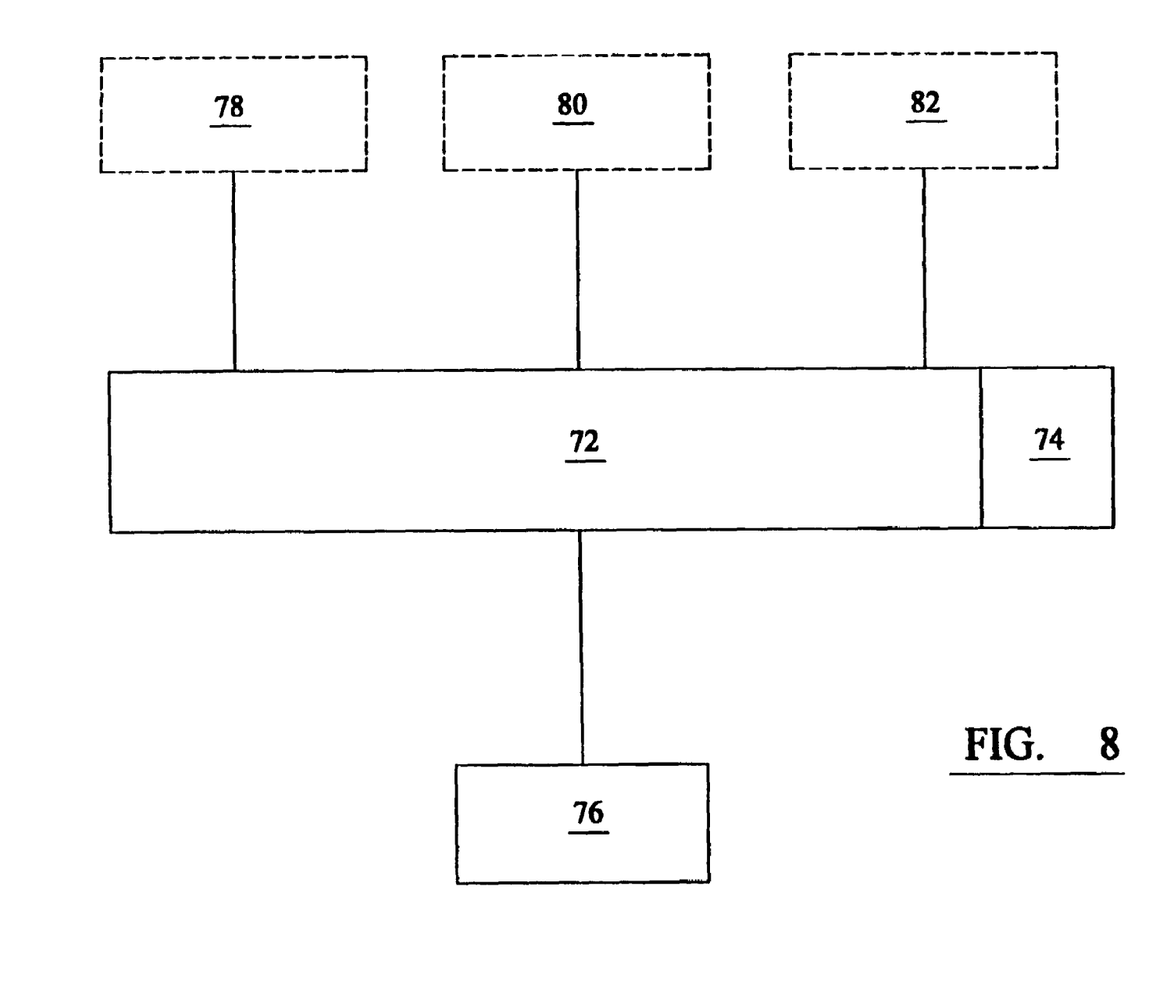
FIG. 8 is a schematic block diagram of the parts of a remote receiver of a computer/projector portion of the interactive display system.

FIG. 8 is a schematic block diagram of the receiver unit 70 shown in FIG. 7. The receiver unit 70 comprises a microprocessor 72 having flash memory 74. Signals are sent from the microprocessor 72 to the PC via a serial interface 76. Signals are received from the whiteboard 10 via an infrared transceiver module 78 of 418/433 MHz radio module 80 or a 2.4 GHz spread spectrum module 82.

The interactive display system disclosed herein uses a whiteboard as a controller for the computer system. This takes advantage of the fact that a whiteboard is the focus of attention in a classroom, making it well suited to host a response system for student feedback devices. The provision of student feedback devices gives a student the ability to control the whiteboard display without leaving his seat. This includes the capability of freehand drawing and annotation. Data from both the whiteboard and from student responses are fed to the host computer down the same serial communications channel, which minimises wiring infrastructures.

The top of a typical whiteboard is above head height and as a result is an ideal vehicle for mounting an infrared transceiver.

The system gives a teacher the ability to test students for assimilation of material which has just been given to students. This has distinct advantages over previous systems which would require the setting of a test and subsequent marking of the test which introduces undesirable time delays into the teaching process.

The provision of the receiver for the student feedback devices on the whiteboard allows the computer which generates the images to be out of the classroom, perhaps in the form of a larger network computer.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An interactive display system comprising: a projector; a device onto which an image is projected from the projector; a computing means; a pointing device; and a plurality of remote signaling devices, in which system:
    the computing means is arranged to supply image information to the device onto which an image is projected from the projector;
    the plurality of remote signaling devices are operable to transmit signals to a receiver portion of the device onto which an image is projected from the projector only in response to a request signal from the device onto which an image is projected from the projector;
    the device onto which an image is projected from the projector includes position indication means for determining the position of the pointing device relative to a surface of the device onto which an image is projected from the projector;
    the pointing device is operable to:
        take precedence over the remote signaling devices; and
        selectively enable each remote signaling device, and
    the device onto which an image is projected from the projector is a communication hub of the system, arranged to:
        request information from each remote signaling device in turn, by polling;
        receive control signals from the pointing device and the plurality of remote signaling devices; and
        transmit the control signals from the pointing device and the plurality of remote signaling devices to the computing means on a single communications link, which link is capable of conveying signals both from the pointing device and the remote signaling devices, in order to control an image on the device onto which an image is projected from the projector.

2. An interactive display system as claimed in claim 1, in which the single link is a wireless connection such as infrared means or radio means.

3. An interactive display system as claimed in claim 1, which is operable to calibrate the location of an image displayed on the device onto which an image is projected relative to the surface of the device onto which an image is projected.

4. An interactive display system as claimed in claim 1, in which the pointing device is operable to induce image control signals in the position indication means, which image control signals are operable to control the computing means and thus image information is displayed on the device onto which an image is projected.

5. An interactive display system as claimed in claim 1, in which the device onto which an image is projected includes an output portion arranged to transmit signals from both the receiver portion and the position indication means to the computing means.

6. An interactive display system as claimed in claim 1, wherein one or more of the plurality of remote signaling control devices is/are operable to control the computing means in substantially the same manner as a key board and mouse combination.

7. A method of operating an interactive display system including: a projector; a device onto which an image is projected from the projector; a computing means; a pointing device; and a plurality of remote signaling devices, the method comprising the steps of:
    projecting an image of a computer display of a computer onto the device onto which an image is projected from the projector,
    adapting the plurality of remote signaling devices to transmit signals to a receiver portion of the device onto which an image is projected from the projector only in response to a request signal from the device onto which an image is projected from the projector;
    determining the position of the pointing device relative to a surface of the device onto which an image is projected from the projector;
    arranging for the pointing device to:
        take precedence over the remote signaling devices, and
        selectively enable each remote signaling device, and
    wherein the device onto which an image is projected from the projector is adapted to be a communications hub of the display system, the method further comprising the steps, at the communications hub, of:
        requesting information from each remote signaling device in turn, by polling;
        receiving control signals from the pointing device and the plurality of remote signaling devices; and
        transmitting the control signals from the pointing device and the plurality of remote signaling devices to the computing means, on a single communications link, which link is capable of conveying signals both from the pointing device and the remote signaling devices, in order to control an image on the device onto which an image is projected from the projector.

8. A method as claimed in claim 7, wherein signals from the plurality of remote signaling devices or each remote signaling device do not contain position related data.

9. A method as claimed in either claim 7, in which the signals from the plurality of remote signaling devices or each remote signaling device are transmitted in response to information displayed on the display device.

10. An interactive display device onto which an image is projected from a projector, forming a communication hub of an interactive display system, comprising:
    a receiver portion for receiving signals from a pointing device and a plurality of remote signaling devices, the plurality of remote signaling devices being operable to transmit only in response to a request signal from the display device; and
    position indication means for determining the position of the pointing device relative to a surface of the display device,
    the interactive display device onto which an image is projected from a projector being arranged:

for the signals from the pointing device to take precedence over signals from the remote signaling devices;
for the pointing device to selectively enable each remote signaling device; and
to request information from each remote signaling device in turn, by polling;
to transmit the received signals to a computing means on a single communications link, which link is capable of conveying signals both from the pointing device and the remote signaling devices and being suitable for displaying an image from a computing means received by said interactive display device onto which an image is projected from a projector.

11. A remote signaling device for use with the interactive display system according to claim 10.

12. An interactive display system according to claim 10 in which the system further comprises an image projector arranged to project image information onto the device onto which an image is projected.

13. An interactive display system according to claim 10 wherein the display system is a device onto which an image is projected.

14. An interactive display system comprising: a projector; a device onto which an image is projected from the projector; a computing means; a pointing device; and a plurality of remote signaling devices, in which system:
the computing means is arranged to supply image information to the device onto which an image is projected from the projector;
the plurality of remote signaling devices are operable to transmit signals to a receiver portion of the device onto which an image is projected from the projector only in response to a request signal from the device onto which an image is projected from the projector;
the device onto which an image is projected from the projector includes position indication means for determining the position of the pointing device relative to a surface of the device onto which an image is projected from the projector;
the pointing device is operable to:
take precedence over the remote signaling devices; and
selectively enable each remote signaling device, and
the device onto which an image is projected from the projector is a communication hub of the system, arranged to:
receive control signals from the pointing device and the plurality of remote signaling devices; and
transmit the control signals from the pointing device and the plurality of remote signaling devices to the computing means on a single communications link, which link is capable of conveying signals both from the pointing device and the remote signaling devices, in order to control an image on the device onto which an image is projected from the projector.

15. A method of operating an interactive display system including: a projector; a device onto which an image is projected from the projector; a computing means; a pointing device; and a plurality of remote signaling devices, the method comprising the steps of:
projecting an image of a computer display of a computer onto the device onto which an image is projected from the projector,
adapting the plurality of remote signaling devices to transmit signals to a receiver portion of the device onto which an image is projected from the projector only in response to a request signal from the device onto which an image is projected from the projector;
determining the position of the pointing device relative to a surface of the device onto which an image is projected from the projector;
arranging for the pointing device to:
take precedence over the remote signaling devices, and
selectively enable each remote signaling device, and
wherein the device onto which an image is projected from the projector is adapted to be a communications hub of the display system, the method further comprising the steps, at the communications hub, of:
receiving control signals from the pointing device and the remote control devices; and
transmitting the control signals from the pointing device and the remote control devices to the computing means, on a single communications link, which link is capable of conveying signals both from the pointing device and the remote signaling devices, in order to control an image on the device onto which an image is projected from the projector.

16. An interactive display device onto which an image is projected from a projector, forming a communication hub of an interactive display system, comprising:
a receiver portion for receiving signals from a pointing device and a plurality of remote signaling devices, the plurality of remote signaling devices being operable to transmit only in response to a request signal from the display device; and
position indication means for determining the position of the pointing device relative to a surface of the display device,
the interactive display device onto which an image is projected from a projector being arranged:
for the signals from the pointing device to take precedence over signals from the remote signaling devices;
for the pointing device to selectively enable each remote signaling device; and
to transmit the received signals to a computing means on a single communications link, which link is capable of conveying signals both from the pointing device and the remote signaling devices and being suitable for displaying an image from a computing means received by said interactive display device onto which an image is projected from a projector.

17. An interactive display system comprising: a projector; a device onto which an image is projected from the projector; a computing means; a pointing device; and a plurality of remote signaling devices, in which system:
the computing means is arranged to supply image information to the device onto which an image is projected from the projector;
the plurality of remote signaling devices are operable to transmit signals to a receiver portion of the device onto which an image is projected from the projector;
the device onto which an image is projected from the projector includes position indication means for determining the position of the pointing device relative to a surface of the device onto which an image is projected from the projector;
the pointing device is operable to:
take precedence over the remote signaling devices; and
selectively enable each remote signaling device, and
the device onto which an image is projected from the projector is a communication hub of the system, arranged to:
receive control signals from the pointing device and the plurality of remote signaling devices; and transmit the control signals from the pointing device and the plurality of remote signaling devices to the computing means on a single communications link, which link is capable of conveying signals both from the pointing device and the remote signaling devices, in order to control an image on the device onto which an image is projected from the projector.

18. A method of operating an interactive display system including: a projector; a device onto which an image is projected from the projector; a computing means; a pointing device; and a plurality of remote signaling devices, the method comprising the steps of:
projecting an image of a computer display of a computer onto the device onto which an image is projected from the projector,
adapting the plurality of remote signaling devices to transmit signals to a receiver portion of the device onto which an image is projected from the projector;
determining the position of the pointing device relative to a surface of the device onto which an image is projected from the projector;
arranging for the pointing device to:
take precedence over the remote signaling devices, and
selectively enable each remote signaling device, and
wherein the device onto which an image is projected from the projector is adapted to be a communications hub of the display system, the method further comprising the steps, at the communications hub, of:
receiving control signals from the pointing device and the remote control devices; and
transmitting the control signals from the pointing device and the remote control devices to the computing means, on a single communications link, which link is capable of conveying signals both from the pointing device and the remote signaling devices, in order to control an image on the device onto which an image is projected from the projector.

19. An interactive display device onto which an image is projected from a projector, forming a communication hub of an interactive display system, comprising:
a receiver portion for receiving signals from a pointing device and a plurality of remote signaling devices, the plurality of remote signaling devices being operable to transmit; and
position indication means for determining the position of the pointing device relative to a surface of the display device,
the interactive display device onto which an image is projected from a projector being arranged:
for the signals from the pointing device to take precedence over signals from the remote signaling devices;
for the pointing device to selectively enable each remote signaling device; and
to transmit the received signals to a computing means on a single communications link, which link is capable of conveying signals both from the pointing device and the remote signaling devices and being suitable for displaying an image from a computing means received by said interactive display device onto which an image is projected from a projector.

20. An interactive display system comprising: a projector; a device onto which an image is projected from the projector; a computing means; a pointing device; and a plurality of remote signaling devices, in which system:
the computing means is arranged to supply image information to the device onto which an image is projected from the projector;
the plurality of remote signaling devices are operable to transmit signals to a receiver portion of the device onto which an image is projected from the projector;
the device onto which an image is projected from the projector includes position indication means for determining the position of the pointing device relative to a surface of the device onto which an image is projected from the projector;
the pointing device is operable to:
take precedence over the remote signaling devices; and
selectively enable each remote signaling device, and
the device onto which an image is projected from the projector is a communication hub of the system, arranged to:
request information from each remote signaling device in turn, by polling;
receive control signals from the pointing device and the plurality of remote signaling devices; and
transmit the control signals from the pointing device and the plurality of remote signaling devices to the computing means on a single communications link, which link is capable of conveying signals both from the pointing device and the remote signaling devices, in order to control an image on the device onto which an image is projected from the projector.

21. A method of operating an interactive display system including: a projector; a device onto which an image is projected from the projector; a computing means; a pointing device; and a plurality of remote signaling devices, the method comprising the steps of:
projecting an image of a computer display of a computer onto the device onto which an image is projected from the projector,
adapting the plurality of remote signaling devices to transmit signals to a receiver portion of the device onto which an image is projected from the projector;
determining the position of the pointing device relative to a surface of the device onto which an image is projected from the projector; and
arranging for the pointing device to:
take precedence over the remote signaling devices, and
selectively enable each remote signaling device, and
wherein the device onto which an image is projected from the projector is adapted to be a communications hub of the display system, the method further comprising the steps, at the communications hub, of:
requesting information from each remote signaling device in turn, by polling;
receiving control signals from the pointing device and the remote control devices; and
transmitting the control signals from the pointing device and the remote control devices to the computing means, on a single communications link, which link is capable of conveying signals both from the pointing device and the remote signaling devices, in order to control an image on the device onto which an image is projected from the projector.

22. An interactive display device onto which an image is projected from a projector, forming a communication hub of an interactive display system, comprising:
a receiver portion for receiving signals from a pointing device and a plurality of remote signaling devices, the plurality of remote signaling devices being operable to transmit; and
position indication means for determining the position of the pointing device relative to a surface of the display device, the interactive display device onto which an image is projected from a projector being arranged:

for the signals from the pointing device to take precedence over signals from the remote signaling devices;

for the pointing device to selectively enable each remote signaling device; and to request information from each remote signaling device in turn, by polling; and to transmit the received signals to a computing means on a single communications link, which link is capable of conveying signals both from the pointing device and the remote signaling devices and being suitable for displaying an image from a computing means received by said interactive display device onto which an image is projected from a projector.

* * * * *